United States Patent [19]

Messina

[11] 4,307,266

[45] Dec. 22, 1981

[54] COMMUNICATION APPARATUS FOR THE HANDICAPPED

[76] Inventor: John D. Messina, 2820 W. Grove La., San Jose, Calif. 95122

[21] Appl. No.: 168,768

[22] Filed: Jul. 11, 1980

Related U.S. Application Data

[63] Continuation of Ser. No. 933,642, Aug. 14, 1978, abandoned.

[51] Int. Cl.³ .......................................... H04M 11/06
[52] U.S. Cl. ............................ 179/2 DP; 179/84 VF
[58] Field of Search .................. 179/2 R, 2 A, 2 DP, 179/84 VF, 84 L; 340/365 R, 365 S

[56] References Cited

U.S. PATENT DOCUMENTS

| | | | |
|---|---|---|---|
| 3,780,225 | 12/1973 | Shannon | 179/2 A |
| 3,896,267 | 7/1975 | Sachs et al. | 179/2 TV |
| 3,967,273 | 6/1976 | Knowlton | 340/365 S |
| 4,012,599 | 3/1977 | Meyer | 179/84 VF |
| 4,013,838 | 3/1977 | Tsai | 179/2 A |

Primary Examiner—Bernard Konick
Assistant Examiner—J. A. Popek
Attorney, Agent, or Firm—Owen L. Lamb

[57] ABSTRACT

A communication device coupled to a standard telephone which has an alphanumeric rotary dial or push-button keyboard. A simple, easily-learned code (11) is utilized which can be transmitted over telephone lines (14) using the rotary or push-button digits (10). To communicate, the called party enters the appropriate position for the letter of the alphabet to be communicated. A second entry identifies which one of the plurality of letters (or the number) is intended to be transmitted. The calling party has apparatus (18, 20) attached to the telephone set (16) which decodes the two-digit coded entry, and converts the two-digit code to a standard machine-readable format which can be displayed on a standard output device (26) such as an alphanumeric display or, for blind persons, a braille or similar output device. The calling party can transmit a message to the called party, by keying characters into a keyboard (22). The keyed-in characters are converted to speech by speech synthesizer (28) for transmission to the called party.

8 Claims, 3 Drawing Figures

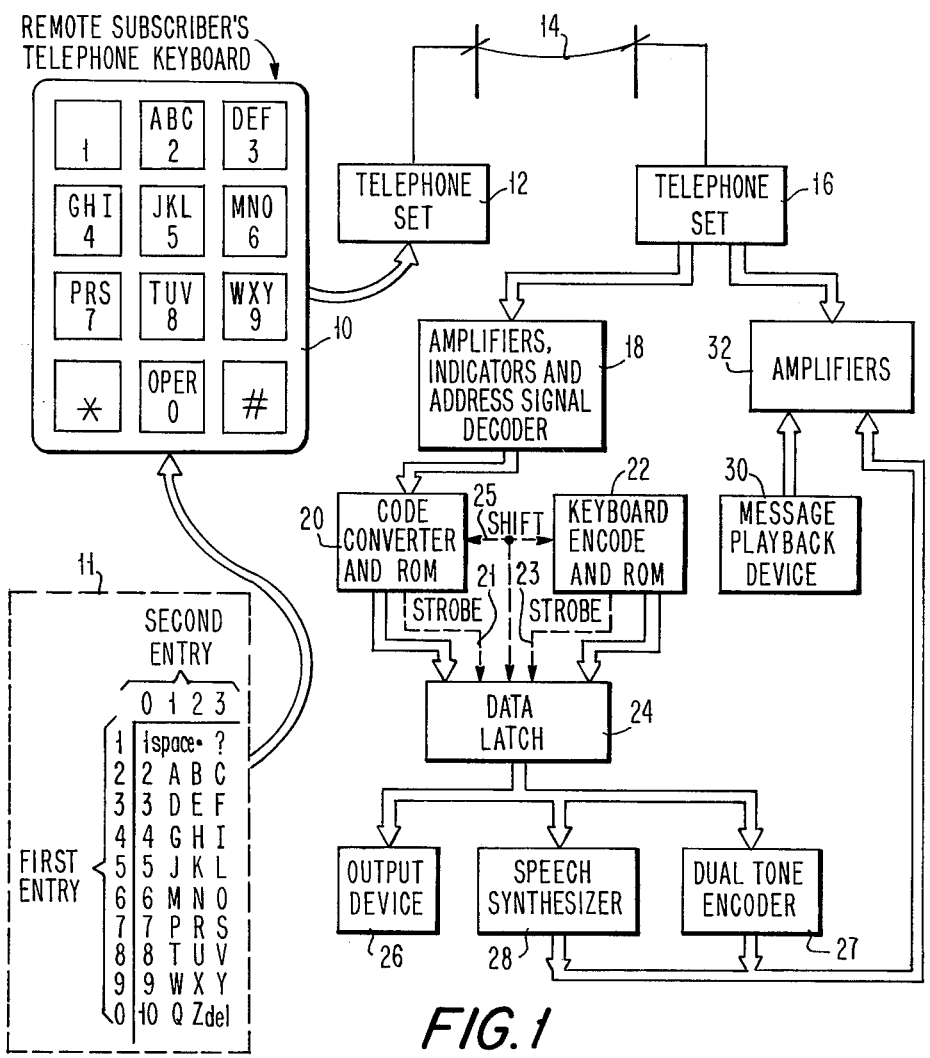
FIG.1
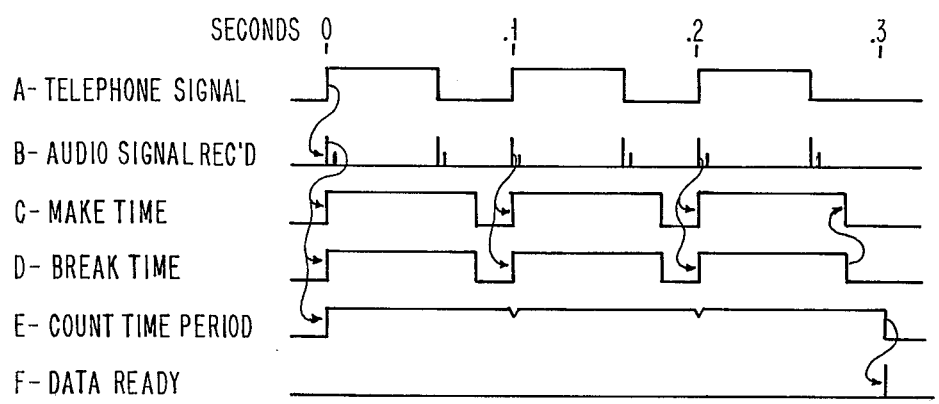
FIG.3  DIAL PULSE DECODER TIMING

COMMUNICATION APPARATUS FOR THE HANDICAPPED

CROSS-REFERENCE TO RELATED APPLICATIONS

This application is a continuation of application Ser. No. 933,642, filed on Aug. 14, 1978 now abandoned.

BACKGROUND OF THE INVENTION

The invention relates to telephone communication devices and more particularly to a device which allows handicapped persons to communicate with anyone over a standard telephone network.

Previously, communications methods used by those with speech and/or hearing handicaps included teletype, telegraphic devices, sign language or written messages. Teletype devices are standard equipment connected to a telephone system by means of a modem. Telegraphic devices utilize either a sound-activated switch or a frequency detector connected to a light or vibrator which is activated in response to a signal which may be conveyed over a standard telephone circuit. This allows a message to be transmitted in a code such as Morse Code. Sign language for the deaf is a form of manual communication where the position and movement of the hands and fingers or gestures represent characters or words. This is used for face-to-face communication or communication by means of television signals which can be transmitted at radio frequencies or over telephone lines. For the uninitiated, written messages are the simplest form of communication. This involves writing out a message and passing the pen and paper back and forth in face-to-face communication.

All of these prior devices have disadvantages. Teletypes are large, heavy, and expensive. They can be used to communicate only with another compatible teletype. Furthermore, teletype systems cannot communicate with any telephone or with a person who does not have a teletype connected to his phone.

Telegraphic devices are also limited to use with a similar device and further require the memorization of Morse Code or other complicated codes. They are also subject to interference by noise, are slow, and are difficult to use, requiring a degree of manual dexterity.

Learning the deaf sign language is time consuming; it requires good manual dexterity, good vision, rapid interpretation, and the memorization of more than 800 signals. Furthermore, it is easily misunderstood and may only be used within visual range or over expensive television circuits.

Finally, written messages are slow, awkward, and require pencil and paper. This technique cannot be used over standard telephone circuits without the use of elaborate television equipment.

SUMMARY OF THE INVENTION

It is a paramount object of this invention to provide a communication device for persons having speech and/or hearing impairment.

It is a further object to provide a communication device which allows persons with speech and/or hearing impairment to communicate with other persons over a standard telephone.

It is another object of this invention to provide a communication code with which a person having speech and/or hearing impairment can communicate through a standard telephone network to a called party whereby the called party after learning the very simple code is able to communicate with the calling party by utilizing the standard telephone dial or pushbutton keyboard.

It is also an object of this invention to provide a communication device which may be used in lieu of sign language or written messages in face-to-face communications.

It is also an object of this invention to provide a communication device which is equipped with a tactile or braille display for those with speech and/or hearing impairments who are also blind.

Briefly, the above objects are accomplished in accordance with the invention by providing a communication device for use with another similar device or a standard telephone set. A standard telephone set has an alphanumeric rotary dial or pushbutton key board having a plurality of positions. Each position is assigned a number and some positions are assigned three letters from the alphabet. The communication device has means for transmitting a recorded message to a called party to instruct the called party in a very simple code utilizing the dial positions. Two entries are necessary to transmit a character. The first entry is chosen by finding the letter or numeral one wishes to transmit. The second entry identifies one of the numerals or letters on that position.

The calling party has a device which decodes the address signals transmitted by dialing the telephone. The digit pairs of the code transmitted are decoded by a code converter into a standard machine-readable code. The machine-readable code is then supplied to an output device such as a display which displays the decoded character.

In accordance with an aspect of the invention, the communication device is provided with a speech synthesizer which responds to a keyboard encoder such that the calling party can spell-out words which can then be transmitted over the telephone lines to the called party.

In accordance with still another aspect of the invention, two persons having speech and/or hearing impairments can communicate by utilizing similar communication devices, in which event only coded signals are transmitted back and forth over the telephone circuits. Also, these devices can be used in face-to-face communications without a telephone since each device is provided with its own keyboard.

The invention has the advantage that unlike other communication devices which are designed for use by those with speech and/or hearing impairment, the present device is specifically designed to meet the special problems of the handicapped in all-around communication situations. It provides an efficient, portable means for the handicapped to communicate conveniently with a variety of standard communications systems such as telephones, radio, etc., without interfering with normal operations and without requiring special internal connections. The apparatus of the present invention is also able to be used in face-to-face communications.

Since the code is easy to learn, the apparatus can be utilized with persons who are unfamiliar with its use such as persons called over the telephone with respect to an emergency situation.

The invention has the advantage that by utilizing a format in which the characters appear on standard sending units such as a telephone sending unit, key pad, radio auto pack, etc., it is not necessary to provide any additional device to transmit messages to and from the apparatus.

The apparatus also provides for simultaneous speech confirmation of information transmitted to it and confirmation of information transmitted by it, since the information is displayed in both instances.

The apparatus of the present invention does not require a person who can hear to have any special device to receive information transmitted by it. This makes it possible for a handicapped person to send and receive information by means of conventional communication systems with any person who can hear without the other party having any special device. It may also be used by any person to exchange information with a person who cannot speak, without the need for any special equipment. This makes it possible for a crisis center, police station, or other emergency facility to receive emergency communication from those with speech handicaps over a standard telephone circuit.

The foregoing and other objects, features, and other advantages of the invention will be apparent from the following more particular description of the preferred embodiment of the invention as illustrated in the accompanying drawings.

DESCRIPTION OF THE DRAWINGS

FIG. 1 is a block schematic diagram of a telephone system in which the present invention is embodied;

FIG. 3 is a timing diagram of the dial-pulse decoder timing.

DETAILED DESCRIPTION OF THE INVENTION

Figure 2:
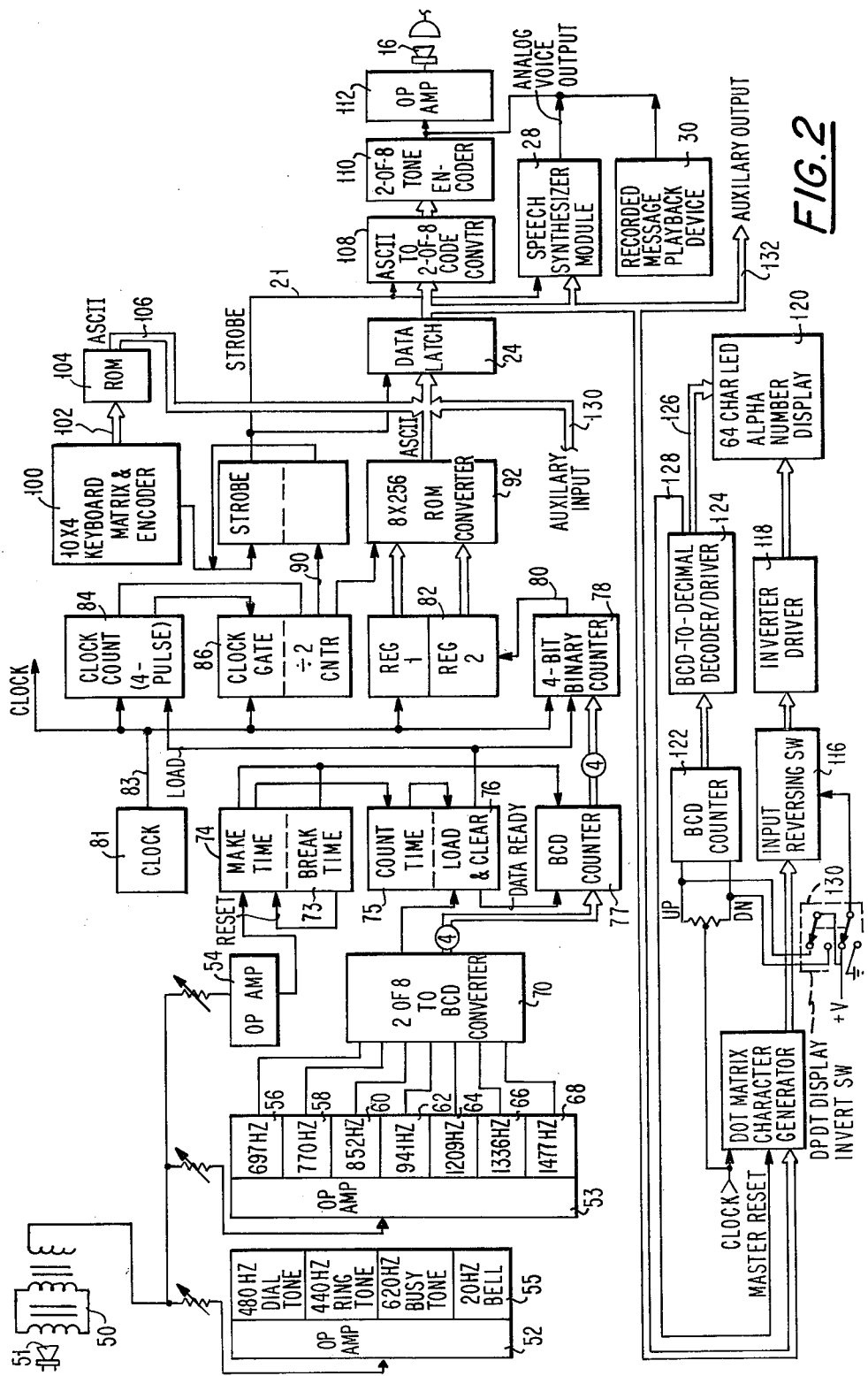
FIG. 2 is a more detailed block schematic diagram of the communication apparatus shown in FIG. 1.

Referring now to FIG. 1, the invention will be described in broad terms. The key pad 10 of a standard telephone is shown as it would appear to a remote subscriber on telephone set 12. The remote subscriber is connected by means of telephone set 12 to a telephone network 14. A calling party is also connected to the telephone network by means of a telephone set 16. The telephone set 16 is connected to acoustic couplers or other suitable coupling devices. The calling party activates the message playback device 30 which contains a recorded message, such as on magnetic tape which is amplified by amplifier 32 and is transmitted through the telephone data set over the telephone network. After the calling party has called the remote telephone subscriber's number, the recorded message is played. The message instructs the called party to spellout the message using a simple code which is transmitted by depressing the keys on the keyboard.

The code operates as follows: Simply depress the button on which the desired letter appears, then depress the number 1, 2, or 3 to indicate which one of the three letters appearing on that number you wish to transmit. Numbers are transmitted in the same manner by simply pressing the button for appropriate number followed by a zero which indicates that it is the number and not the letter on that button that is to be transmitted. This code is shown in detail within the dotted lines 11 of FIG. 1. The first entry selects a group of alphanumeric characters and the second entry selects a particular character within that group. A space is indicated by depressing a one followed by a one, the end of sentence (.) is indicated by depressing a one followed by a two, and a question mark is indicated by a one followed by a three. (The * and # keys provide the ASCII control and shift functions, respectively.

Signals received from the remote subscriber in accordance with this code are amplified by circuit 18 and decoded by means of a rotary dial pulse decoder, if a rotary dial telephone is being used, or by a dual tone decoder if a pushbutton telephone is being used. The pairs of characters received are converted by code converter 20 which converts the pairs of address signals into a signal ASCII standard code used for information interchange among data processing systems, communications systems, and associated equipment. The digital characters of this code are stored in a data latch 24 and then trans-mitted to an output device 26. The output device may be a display device which is capable of displaying characters from the standard code. A strobe line 21 is utilized to pass the information from the code converter 20 to the data latch 24.

A keyboard encoder and read-only memory 22 is provided so that the calling party can also transmit information in accordance with the two digit code, for those situations where the remote subscriber also has a communication device capable of receiving the code. The characters read from the ROM are in the standard ASCII code and are stored in the data latch 24. The characters are displayed in the output device 26 for verification and also energize a speech synthesizer 28 which transforms the ASCII code into spoken words. Telesensory Systems, Inc., of Palo Alto, California, sells a Speech Synthesizer Module which generates spoken words in response to ASCII coded characters, which is suitable for this purpose.

Referring now to FIG. 2, the circuit of FIG. 1 will be described in more detail. A magnetic pickup and audio driver 50 couples the circuit to the telephone output transducer 51. The output of the audio driver is coupled to operational amplifiers 52, 53, and 54. The operational amplifier 52 drives a number of circuits 55 which respond to standard signaling frequencies to provide dial tone, ring tone, busy tone, and to activate the telephone bell indicator. In order for a person with a hearing handicap to know that the telephone is ringing, it is necessary to provide a signal in the form of a flashing light or vibrator. A sound-activated switch may be employed to provide this function.

The operational amplifier 53 drives a number of decoder circuits, 56, 58, 60, 62, 64, 66, and 68 which detect standard DTMF signal frequencies as produced by a standard pushbutton telephone. These detected frequencies drive a two-of-eight to BCD converter 70. A strobe pulse 72 is generated when a steadystate output has been achieved. The Motorola MC 14419 is suitable for this code conversion application.

A rotary-dial pulse decoder is provided for handling signals from dial-type telephones and is driven by operational amplifier 54. The decoding is accomplished through the use of retriggerable one-shot timers 73, 74, 75, 76 and a BCD counter 77. Waveshapes at lettered points in FIG. 1 are shown in FIG. 3. The two one-shot timers, 73 and 74, perform the function of debouncing and signal shaping. The one-shot timer 75 performs the function of a slow release relay to determine the count period and to trigger a data-ready strobe (one-shot 76) at the conclusion of the count period. The data-ready strobe resets the counter and enters the data into the code converter circuits.

Although dual tone signals should not normally activate the rotary-dial decoder, noise and false signals could result. For this reason, a data strobe 72 from the dual-tone decoder deactivates the rotary-dial decoder when a dual-tone signal is present.

The code converter accepts serial pairs of coded binary telephone signal digits from the BCD counter 77 and converts them into coded alphanumeric characters in ASCII standard code format. The code converter also contains circuitry for detecting and correcting improper inputs by resetting if the second coded digit of the pair represents a number which is greater than three. As described above, the second entry during transmission should be no greater than three. The code converter also provides a strobe pulse when a valid output is available. The clock signal loads the BCD character from counter 77 into 4-bit binary counter 78. From the counter 78 the first character is then shifted via line 80 into a two-character register 82. A clock circuit 84 generates clock signals which are counted by a clock count (4-pulse) circuit 86. Once 4-bit characters have been loaded the clock gate 86 generates a signal 90 to cause an ASCII character to be read out of the read-only memory 92 and into the data latch 24. At the same time a strobe signal 21 is generated.

A keyboard unit is provided which is comprised of 10×4 keyboard matrix 100 which has keys on it which drive a keyboard encoder. The output 102 of the keyboard encoder drives a read-only memory 104 which provides ASCII characters over lines 106 to the data latch 24. The output of the data latch 24 drives an ASCII to 2-of-8 code connecter 108. The 2-of-8 code connecter drives a 2-of-8 tone encoder which accepts digital inputs in a 2-of-8 code format and digitally synthesizes the high and low band sine waves specified by telephone tone dialing systems. The MC14410 2-of-8 tone E modes manufactured by Motorola, Inc. is suitable for this application.

The output from the data latch also drives a display. Suitable components for a display are manufactured by Fairchild Camera and Instrument Corp. The dot matrix character generator 114 receives an ASCII input from data latch 24 and generates 64 characters in a 5×7 bit format. The dot matrix 114 drives on input reversing switch 116 (which allows characters to be inverted). The switch drives an inverter driver 118 which provides an interface to a 64 character LED alphanumeric display 120. The display 120 is capable of displaying the 64-character-ASCII code.

A synchronous up/down BCD counter 122 driven by the clock output 83 in combination with a BCD-to-decimal connector 124 provides the roster scan input 126 to the display. The master reset input 128 to the character generator is also generated by the decoder 124.

A display invert switch 130 is provided. When in the position shown, the voltages impressed on the input reversing switch 116 cause the characters to be not inverted. In the opposite position of switch 130, the characters are inverted. Furthermore, when in the position shown, the BCD counter 122 counts up in response to the clock input 83, and when the switch is in the opposite position, the BCD counter 122 counts down. With the circuit arrangement, the characters on display 120 are displayed either upright, from left to right across the screen, or upside down and from right to left. This enables the user of the communication device to display characters in an upright position with respect to someone facing the user.

The auxilary input 130, and the auxilary output 132 are provided to enable two similar communication devices to be connected together without going through a telephone set. Thus, two handicapped persons can communicate face-to-face by merely keying in letters via keyboard 100. The characters keyed in on one device will be displayed on the other and vice versa.

The auxiliary input/output also allows for the coupling of the device of the present invention to teletype keyboards, cathode-ray tube displays, and other ASCII-compatible computer equipment, or to meet special requirements of severely handicapped individuals.

While the invention has been particularly shown and described with reference to a preferred embodiment thereof, it will be understood by those skilled in the art that various changes in form and details may be made therein without departing from the spirit and scope of the invention.

What is claimed is:

1. For use with a network utilizing telephone signals to enable a handicapped calling party to communicate over said network with a called party by the use of a code format for identifying various characters assigned to dial positions on a telephone-type dial, said code comprised of at least two telephone signals, one signal identifying a dial position of said telephone-type dial, and another signal identifying one of a plurality of alphanumeric characters assigned to said position, said telephone signals being selected and transmitted in a predetermined sequence, apparatus comprising:

means for decoding said telephone signals from said called party to provide decoded signals;

means connected to said decoding means for registering said decoded signals in said predetermined sequence;

means responsive to said registering means for converting said decoded signals into a decoded character in accordance with said code format;

encoding means manually operable by said calling party for providing encoded characters corresponding to a message of said calling party;

a speech synthesizer responsive to said encoding means for transmitting said encoded characters as spoken words over said network to said called party;

an output device; and means connected to said output device, responsive to said converting means, for energizing said output device in such a manner that a human being is able to sense said decoded characters;

whereby a calling party is able to communicate with a called party over standard telephone lines, said calling party being able to spell-out words by transmitting speech corresponding to said encoded characters corresponding to a message of said calling party, said apparatus being further able to decode telephone signals to thereby receive words spelled out by said called party by use of said code format.

2. The combination in accordance with claim 1 wherein said encoding means comprises a keyboard input device for inputting characters; and means responsive to said keyboard device for encoding said characters.

3. The combination in accordance with claim 1 further comprising means for transmitting a message to said called party, said message including instructions about said code format.

4. The combination in accordance with claim 1 further comprising auxiliary output means for connecting said apparatus with a similar apparatus to thereby enable direct communication between the two apparatuses.

5. The combination in accordance with claim 1 wherein said one signal is generated in response to the dialing of any one of the alphanumeric dial positions of said telephone-type dial and said another signal is generated in response to the dialing of one of the following alphnumeric dial positions of said telephone-type dial: 0, 1, 2, 3;

said means for decoding said telephone signals further including, first means for decoding dual-tone telephone signals;

second means for decoding rotary-dial telephone signals;

said means for registering further including, means for registering a pair of decoded signals, a first decoded signal of said pair of decoded signals corresponding to said one signal, and a second decoded signal of said pair of decoded signals corresponding to said another signal; and wherein, said converting means includes means for converting said pair of decoded signals into a coded character in accordance with said code format such that said first decoded signal selects a group of alphanumeric coded characters corresponding to the alphanumeric characters assigned to the dial position identified by said one signal, and said second decoded signal selects one of the alphanumeric characters in said group.

6. The method of utilizing telephone signals to enable a handicapped calling party to communicate over a network with a called party by the use of a code format for identifying various characters assigned to dial positions on a telephone-type dial, said code comprised of at least two telephone signals, one signal identifying a dial position of said telephone-type dial and another signal identifying one of a plurality of alphanumeric characters assigned to said position, said telephone signals being selected and transmitted in a predetermined sequence, said method comprising the steps of:

(1) decoding said telephone signals from said called party to provide decoded signals;

(2) registering said decoded signals in said predetermined sequence to provide registered decoded signals;

(3) converting said registered decoded signals into decoded characters in accordance with said code format;

(4) inputting characters from a manually operable input device;

(5) encoding said inputted characters to provide encoded characters;

(6) transmitting said encoded characters over said network to said called party by means of a speech synthesizer; and, (7) energizing an output device in such a manner that a human being is able to sense said decoded characters;

whereby said calling party is able to communicate with said called party over standard telephone lines, said calling party being able to spell out words by transmitting speech corresponding to characters inputted from said manually operable input device, and to receive words spelled out by said called party by use of said code format.

7. The method in accordance with claim 6 further comprising the step of transmitting a message to said called party, said message including instructions about said code format.

8. The method in accordance with claim 6 further comprising the step of connecting said apparatus with a similar apparatus to thereby enable direct communication between the two apparatuses.

* * * * *